Figure 1A:
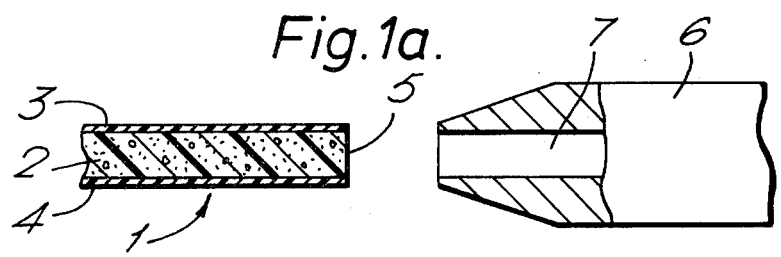

United States Patent [19]

Ölsén

[11] 4,201,609
[45] May 6, 1980

[54] METHOD FOR T OR BUTT SEALING OF LAMINATED ALL-PLASTIC MATERIAL

[75] Inventor: Jan-Erik Ölsén, Malmö, Sweden

[73] Assignee: AB Ziristor, Lund, Sweden

[21] Appl. No.: 904,537

[22] Filed: May 10, 1978

Related U.S. Application Data

[63] Continuation of Ser. No. 747,096, Dec. 3, 1976, abandoned.

[30] Foreign Application Priority Data

Dec. 19, 1975 [SE] Sweden ............................ 75144436

[51] Int. Cl.² .................. B32B 31/26; B32B 3/04; B29C 27/02
[52] U.S. Cl. .................. 156/85; 156/84; 156/196; 156/198; 156/216; 156/304; 156/322; 156/497; 156/499; 156/182; 156/308.6; 264/248; 428/192; 428/322
[58] Field of Search ............ 156/65, 71, 84, 157, 156/196, 198, 201, 202, 211, 216, 304, 306, 322, 497, 85, 499; 264/248; 428/119, 120, 192, 322

[56] References Cited

U.S. PATENT DOCUMENTS

| | | | |
|---|---|---|---|
| 3,367,818 | 2/1968 | Voelker | 156/216 |
| 3,438,826 | 4/1969 | Van Eikeren et al. | 156/306 X |
| 3,509,005 | 4/1970 | Hartig | 428/119 X |
| 3,816,234 | 6/1974 | Winfield | 52/309.9 X |

*Primary Examiner*—William A. Powell
*Assistant Examiner*—Robert A. Dawson
*Attorney, Agent, or Firm*—Burn, Doane, Swecker & Mathis

[57] ABSTRACT

A method of joining two sheets of a laminated thermoplastic material in a joint wherein the edge portion of a first sheet is butted against a face of a second sheet in which an edge portion of the first sheet, which consists of a central layer of porous plastic material such as a foamed polystyrene and compact facing layers of a thermoplastic material such as polystyrene or polythene, is heated by hot air which first causes the edge portion of the central layer to soften and retract followed by softening of the edge portions of the facing layers which then turn inwardly and join together thus closing off the central layer. The edge portion is then butted against and joined to a heated-up compact thermoplastic layer of the second sheet.

10 Claims, 4 Drawing Figures

METHOD FOR T OR BUTT SEALING OF LAMINATED ALL-PLASTIC MATERIAL

This is a continuation, of application Ser. No. 747,096, filed Dec. 3, 1976 and now abandoned.

The present invention relates to a method to increase in the T or butt sealing of a laminated thermoplastic material, of the type which comprises a carrier layer of porous plastic material and outer layers of compact plastic material, the strength of the seal by heat treatment of the edge surface at which the sealing is to be carried out.

Packages impervious to liquid, e.g. for liquid foodstuffs, are manufactured inter alia from laminated all-plastic material which comprises a central layer of foamed, porous plastic material and on either side of this, laminated layers of compact plastic material. The central layer is appreciably thicker than the outer layers and may e.g. have a thickness of 0.8 mm, whilst each of the outer layers has a thickness of approx. 0.1 mm. This laminated material may also comprise further layers of plastic material or e.g. aluminium foil, but the main principle of the material is the joist-like construction with a comparatively thick, porous central layer and two laminated layers on either side of this which impart a very good rigidity to the material. This material has been the object of increasing popularity in recent times, which is due primarily to the fact that the material is extraordinarily light and furthermore cheaper than the types of packing laminate used previously with a central layer of paper.

The different types of known packages which are manufactured from the said laminated plastic material are of various different designs and consequently also have joints or seams of many different types. The different types have in common, however, that in the joining and sealing the thermoplastic properties of the material are utilized, that is to say, the joining is generally carried out so that the area intended for joining is heated to such a temperature that the thermoplastic material softens, whereupon a direct joining and pressing together takes place. In overlap joints, or joints of the inside-to-inside type, this method has proved to give very durable seals, since comparatively large portions of the surface layers of the material are joined to one another. To offer greater possibilities of shaping and design of the types of packages it is also desirable to allow sealing of the said laminate material in T joints or butt joints, that is to say joints of a type wherein the material sheets concerned are joined in T shape or edge to edge. In joints or seams of this type, at least as far as the one material sheet is concerned, only the edge surface of the material sheet can be used for the seal. Since the central carrier layer of the foamed plastic material in itself has very low strength, it is in effect only the edge surfaces of the two homogeneous plastic layers which are utilized in the joining, and as a consequence thereof this type of joint is on the one hand difficult to execute, so that the joint becomes impervious to liquid, and has on the other hand unsatisfactory strength.

It has been suggested to overcome this problem by not utilizing the thermoplastic properties of the material in the joining process, but instead to apply in connection with the joining a heat-meltable glue, a so-called hot-melt, to the place of the joint. This solution, however, is subject to serious disadvantages, since the application of hot-melt constitutes an extra action which complicates the machines manufacturing the packages.

It is an object of the present invention to provide a method which makes it possible to join together thermoplastic material of the said type in T joints or butt joints whilst utilizing the thermoplastic properties of the material and without application of any kind of adhesive.

It is a further object of the present invention to provide a method for achieving tight and strong T or butt joint seals of the said laminated thermoplastic material, which method is not subject to the aforementioned disadvantages.

These and other objects have been achieved in accordance with the invention in that a method of the type described at the beginning was given the characteristic that the said edge surface before the sealing is warmed up by means of a jet of hot air, whose main flow has a somewhat greater thickness than the carrier layer of the material and is directed at a substantially right angle against the edge surface, so as to provide before the sealing operation such a melting of the edge surface that the carrier layer draws back and the two outer layers are melted towards each other, and meet substantially in the centre plane of the material.

Preferred embodiments of the method in accordance with the invention have been given, moreover, the characteristics which are evident from the subsidiary claims.

By the method in accordance with the invention a new solution of the problem of joining together laminated thermoplastic material in T joints or butt joints is obtained. According to the invention no additive material of any kind is used, but instead the material edge itself is transformed, so that it becomes more suitable for sealing. The solution shown may be carried out in conjunction with the normal, necessary heating up of the edge in conjunction with the actual sealing and does not require any complicated auxiliary equipment but merely a more accurate and specially oriented heating of the material edges which are to be joined together.

In the following the invention will be described in more detail with reference to the enclosed schematic drawing.

FIG. 1 a–c show partly in section and on an enlarged scale the successive heating of a material edge by using the method in accordance with the invention.

Figure 2:
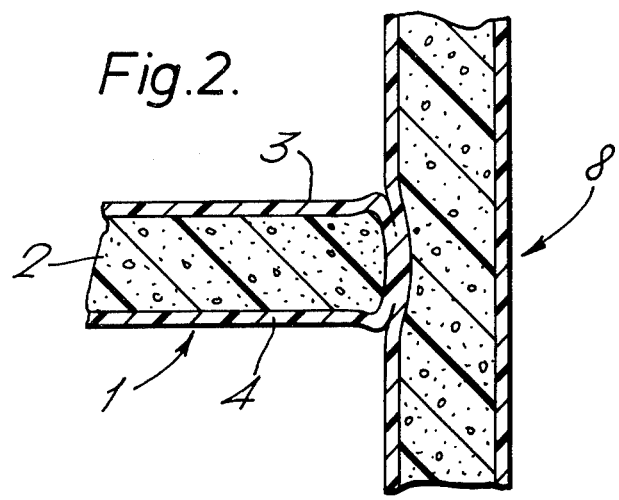

FIG. 2 shows in section and further enlarged two material sheets after heating by the method in accordance with the invention and subsequent joining together.

In FIG. 1 is shown a part of a material sheet comprising a central layer 2 of porous plastic material, e.g. foamed polystyrene. The central carrier layer 2 has a thickness of 0.8 mm and is laminated on both sides with compact layers 3, 4 of thermoplastic material, e.g. polystyrene or polythene. The layers 3, 4 are each approx. 0.1 mm thick. The edge 5 of the material sheet, which on the drawing is on the righthand side, is cut off, substantially at a right angle to the plane of the material sheet 1. To the right of this sheet edge 5 is a nozzle 6 which is provided with a number of air exit holes 7 which are cylindrical or oblong and are arranged close to one another in a row, the length of which corresponds to the width of the material sheet or to the length of edge surface 5 which is to be heated by means of a jet of hot air issuing through the ducts 7 of the nozzle 6. The duct 7 has a thickness which corresponds to approx. 1-3 times the thickness of the carrier layer 2.

Figure 1B:
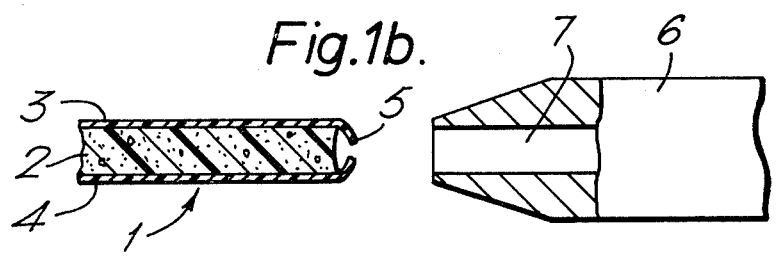
Figure 1C:
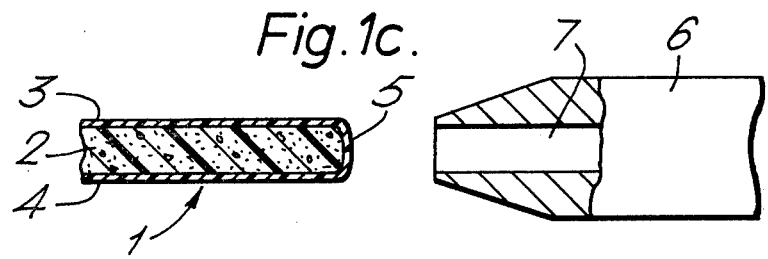

In FIG. 1a is shown the material sheet before the heating by hot air of the material edge 5. In FIG. 1b is shown the material sheet during the heating of the edge 5, and in FIG. 1c is shown the material sheet directly before interruption of the heating. FIG. 2. shows the material sheet 1 after being joined together in a T joint with a second material sheet 8, which may be of the same type and make-up as the material sheet 1.

When the two material sheets 1, 8 are to be joined together by means of a T-joint, the procedure according to the invention is as follows: The one material sheet 1 (FIG. 1a), whose outer layers 3, 4 are of identical thickness, is placed so in relation to the opening 7 of the nozzle 6, that the centre-line of the said opening coincides with the centre plane of the material sheet 1. The distance between the edge surface 5 of the material sheet 1 and the opening of the air duct 7 is appropriately chosen so that the distance is 1-1.5 times the thickness of the material sheet 1. The alignment and the adjustment of the distance between the material sheet 1 and the nozzle 6 can be carried out, depending on the type of packing machine in which the operation is taking place, either by moving of the material sheet 1, by moving of the nozzle 6 or by moving of both parts.

After the relative alignment of the material sheet 1 and the nozzle 6, a hot air stream is blown via the duct 7 of the nozzle against the edge surface 5 of the material sheet 1. By virtue of the alignment of the nozzle 6 the main flow of the air jet, which may be assumed to have almost the same thickness or diameter as the duct 7, will strike the edge surface 5 symmetrically which, as can be seen from FIG. 1b, results in that the carrier layer 2 after heating to its softening temperature draws back a little in relation to the outer layers, owing to the fact, on the one hand, that layer 2 melts earlier than the outer layers (which have an appreciably higher heat capacity), and, on the other hand, the effect of the dynamic pressure of the issuing hot air. At the same time the two outer layers 3, 4 of the material sheet 1 will on their outer portions situated at the edge surface 5 soften through the effect of the heat and be bent inwards towards the centre plane of the material sheet.

On continued heating (FIG. 1c), the folding in of the edge zone 5 of the two outer layers, 3, 4 will continue until the edges of the layers meet and partly fuse together straight before the centre plane of the material sheet 1. The layers will then protect the foam material lying underneath from further melting.

Directly after this softening and transformation of the edge surface 5 of the material sheet 1, the nozzle 6 is removed and the edge surface 5 of the material sheet 1 is joined together with the second material sheet 8 to which it is to be joined in a T-joint. Parallel with the described heating of the edge surface 5 of the material sheet, a heating is carried out appropriately also of the surface layer of the other material sheet 8 which is to be used for the assembling.

In FIG. 2 is shown on a larger scale a section through the two material sheets 1, 8 joined together. It is evident from the figure that the joint has been carried out wholly between the two folded-in outer layers 3, 4 of the material sheet 1 and the one outer layer of the other material sheet 8, so that a very strong and durable attachment has been achieved.

In the case described above the two outer layers of the laminated thermoplastic material are thus of the same type and thickness, which means that in order to ensure a regular, symmetrical folding-in of the outer layers, the hot air jet should be directed towards the central part of the carrier layer 2 exposed on the edge of the laminate. In other words, the nozzle is situated in the prolongation of the centre plane of the material sheet.

If the material sheet whose edge surface is to be utilized for sealing is covered with outer layers of different thickness or of different type, it may become necessary to shift the nozzle parallel in relation to the centre plane of the material sheet, so that a symmetrical folding-in of the outer layers can be achieved. The nozzle is moved in the direction towards the thicker surface layer, and the necessary distance will best be ascertained in each individual case. Such a shifting of the nozzle may also be necessary for other reasons, e.g. if the packing machine in which the process is carried out causes an unequal heat discharge to take place from the outer layers of the laminate.

The thickness of the hot air jet is adapted to the thickness of the material sheet which is to be treated. The main flow of the hot air jet, whose thickness can be regarded as corresponding substantially to the thickness of the nozzle hole 7, is chosen so that its thickness of 1-3 times the thickness of the carrier layer of the laminated material. The hot air jet has a total thickness which is 1.5 to 4 times the total thickness of the material. For the material thicknesses in actual use for the manufacture of packing containers for beverages and the like this means that the hot air jet has a total thickness of between 1-5 mm. For thermoplastic material of the said types, that is to say polystyrene or polythene, the hot air jet must have a temperature of 350-450°C and preferably approx. 400°C, and a speed of 6-12 m/sec, preferably approx. 7.5 m/sec. At lower temperatures and speeds the required heating of the material is not obtained within a reasonable period, and higher temperatures and air speeds produce a rather irregular deformation of the material edge.

The folding down or in of the outer layers of the thermoplastic material can take place by means of the method in accordance with the invention, independently of a possible orientation in the laminate layers. Tthe operation may take place on a stationary or moving material web, depending on the type of packing machine which is to be used.

I claim:

1. A method for joining a first laminated sheet with another surface, said laminated sheet having a carrier layer of foamed thermoplastic material and outer layers of a compact thermoplastic material on opposed sides thereof, said method comprising directing a jet of hot air toward and substantially at right angles to the edge surface of the laminated sheet, directly contacting said edge surface with said hot air, the jet of hot air having such force and temperature as to cause the carrier layer of the laminated sheet to shrink and retract from the edge thereof and cause the outer layers of compact thermoplastic material to soften and bend inwardly toward the retracted carrier layer and meet substantially at the center plane of the laminated sheet thereby forming an integral layer of softened, compact thermoplastic material along the edge surface of the laminated sheet pressing said layer of softened, compact thermoplastic material against said another surface and allowing said layer of softened, compact thermoplastic material to harden thereby forming a strong, tight seal.

2. The method of claim 1 wherein said another surface is the heat softened, compact thermoplastic material on the edge surface of a second laminated sheet thereby forming a butt seal.

3. The method of claim 1 wherein said another surface is the heat softened, compact thermoplastic material of an outer layer of a second laminated sheet thereby forming a T-seal.

4. The method of claim 1 wherein the outer layers of compact thermoplastic material are of equal thickness and the axis of the jet of hot air is directed along the center plane of the laminated sheet.

5. The method of claim 1 wherein the outer layers of compact thermoplastic material are of unequal thickness and the axis of the jet of hot air is directed along a plane parallel to the center plane of the laminated sheet and disposed laterally toward the thicker layer of compact thermoplastic material.

6. The method of claim 1 wherein the jet of hot air has a thickness which is 1 to 3 times the thickness of the carrier layer of the laminated sheet.

7. The method of claim 1 wherein the jet of hot air has a total thickness which is 1.5 to 4 times the thickness of the laminated sheet.

8. The method of claim 1 wherein the jet of hot air has a thickness of 1 to 5 mm.

9. The method of claim 1 wherein the jet of hot air has a temperature of from 350° to 450°C.

10. The method of claim 1 wherein the jet of hot air has a velocity of from 6 to 12 m/second.

* * * * *